United States Patent
Ro et al.

(10) Patent No.: US 11,115,840 B2
(45) Date of Patent: Sep. 7, 2021

(54) APPARATUS AND METHOD FOR RADIO LINK MONITORING IN A WIRELESS COMMUNICATION SYSTEM

(71) Applicant: Samsung Electronics Co., Ltd., Gyeonggi-do (KR)

(72) Inventors: Sang-Min Ro, Seoul (KR); Joon-Young Cho, Gyeonggi-do (KR); Young-Bum Kim, Seoul (KR); Seung-Hoon Choi, Gyeonggi-do (KR); Youn-Sun Kim, Gyeonggi-do (KR); Hyo-Jin Lee, Seoul (KR); Hyoung-Ju Ji, Seoul (KR)

(73) Assignee: Samsung Electronics Co., Ltd

( * ) Notice: Subject to any disclaimer, the term of this patent is extended or adjusted under 35 U.S.C. 154(b) by 536 days.

(21) Appl. No.: 14/241,308

(22) PCT Filed: Oct. 4, 2012

(86) PCT No.: PCT/KR2012/008044
§ 371 (c)(1),
(2) Date: Feb. 26, 2014

(87) PCT Pub. No.: WO2013/051864
PCT Pub. Date: Apr. 11, 2013

(65) Prior Publication Data
US 2014/0286176 A1     Sep. 25, 2014

(30) Foreign Application Priority Data

Oct. 4, 2011     (KR) .................. 10-2011-0100628

(51) Int. Cl.
*H04W 24/02*     (2009.01)
*H04W 36/00*     (2009.01)
(Continued)

(52) U.S. Cl.
CPC ....... *H04W 24/04* (2013.01); *H04W 36/0094* (2013.01); *H04W 24/08* (2013.01); *H04W 84/047* (2013.01)

(58) Field of Classification Search
USPC ......................................................... 370/242
See application file for complete search history.

(56) References Cited

U.S. PATENT DOCUMENTS 5,369,639 A     11/1994 Kamerman et al.
9,014,020 B2 *   4/2015 Gao ...................... H04W 48/12
                                                    370/252
(Continued)

FOREIGN PATENT DOCUMENTS

| CN | 102144366 | 8/2011 |
| KR | 1020100096035 | 9/2010 |
| KR | 1020110047115 | 5/2011 |

OTHER PUBLICATIONS

"3GPP TS 36.133 V10.4.0"; Requirements for support of radio resource management (Release 10); by 3GPP Organizational Partners (ARIB, ATIS, CCSA, ETSI, TTA, TTC), dated Sep. 2011.*

(Continued)

*Primary Examiner* — Gregory B Sefcheck
*Assistant Examiner* — Majid Esmaeilian
(74) *Attorney, Agent, or Firm* — The Farrell Law Firm, P.C.

(57) ABSTRACT

An apparatus and method for radio link monitoring in a wireless communication system are provided, in which a transmission point communicating with a network where a Base Station (BS) and at least one Remote Radio Head (RRH) coexist within a cell receives Reference Signal Configuration Information (RSCI) from the network to which the transmission point belongs, receives RSs of at least one RS type indicated by the received RSCI from the
(Continued)

BS and the at least one RRH that coexist within the cell, and performs radio link monitoring using the received RSs of the at least one RS type.

17 Claims, 4 Drawing Sheets

(51) Int. Cl.
*H04W 24/04* (2009.01)
*H04W 24/08* (2009.01)
*H04W 84/04* (2009.01)

(56) References Cited

U.S. PATENT DOCUMENTS

| | | | |
|---|---|---|---|
| 2010/0056170 A1 | 3/2010 | Lindoff et al. | |
| 2010/0112956 A1 | 5/2010 | Jeong et al. | |
| 2010/0323720 A1* | 12/2010 | Jen | H04W 64/00 455/456.1 |
| 2011/0021154 A1 | 1/2011 | Marinier et al. | |
| 2012/0039298 A1* | 2/2012 | Lee | H04L 5/0051 370/330 |
| 2012/0044821 A1 | 2/2012 | Kim et al. | |
| 2012/0201187 A1 | 8/2012 | Koo et al. | |
| 2012/0252471 A1* | 10/2012 | Futaki | G01S 5/0018 455/450 |
| 2012/0307699 A1* | 12/2012 | Lindoff | H04W 52/0206 370/311 |
| 2013/0028182 A1* | 1/2013 | Geirhofer | H04B 7/0626 370/328 |
| 2013/0039349 A1* | 2/2013 | Ebrahimi Tazeh Mahalleh | H04L 1/0013 370/328 |
| 2013/0094547 A1* | 4/2013 | Kang | H04W 72/042 375/219 |
| 2013/0176978 A1* | 7/2013 | Abe | H04W 72/04 370/329 |
| 2013/0208677 A1* | 8/2013 | Lee | H04W 24/10 370/329 |
| 2013/0215857 A1* | 8/2013 | Wu | H04W 52/42 370/329 |
| 2013/0265981 A1* | 10/2013 | Yang | H04W 52/146 370/329 |
| 2013/0286997 A1* | 10/2013 | Davydov | H04B 7/024 370/329 |
| 2014/0286176 A1* | 9/2014 | Ro | H04W 24/04 370/242 |
| 2015/0156657 A1* | 6/2015 | Ji | H04W 24/04 370/228 |

OTHER PUBLICATIONS

Panasonic, "Flexible CoMP Operation based on Dedicated CSI-RS Configuration", R1-111587, 3GPP TSG RAN WG1 Meeting #65, May 9-13, 2011, 5 pages.
ETRI, "Discussion on Further Details of Scenario 4", R1-111000, 3GPP TSG RAN WG1 Meeting #64, Feb. 21-25, 2011, 3 pages.
MediaTek Inc., "Discussion on CSI-RS Reconfiguration for CoMP", R1-112346, 3GPP TSG-RAN WG1 #66, Aug. 22-26, 2011, 5 pages.
Alcatel-Lucent et al., "Further Details of CoMP Scenarios for Evaluation, especially Scenario 4", R1-110802, 3GPP TSG RAN WG1 #64, Feb. 21-25, 2011, 8 pages.
European Search Report dated Jun. 30, 2015 issued in counterpart application No. 12837896.5-1854, 9 pages.
Chinese Office Action dated Dec. 5, 2016 issued in counterpart application No. 201280049067.3, 11 pages.
Research in Motion, UK Limited, "Downlink CSI Feedback for Low-Power Nodes", R1-111662, 3GPP TSG RAN WG1 Meeting #65, May 9-13, 2011, 6 pages.
MediaTek, "Further Discussions of Standardization Impacts on CoMP", R1-112343, 3GPP TSG-RAN WG1 #66, Aug. 22-25, 2011, 3 pages.
Japanese Office Action dated Apr. 10, 2017 issued in counterpart application No. 2014-534474, 7 pages.
Korean Office Action dated Nov. 20, 2017 issued in counterpart application No. 10-2011-0100628, 7 pages.
PCT/ISA/237 Written Opinion issued on PCT/KR2012/008044 (pp. 4).
PCT/ISA/210 Search Report issued on PCT/KR2012/008044 (pp. 3).

* cited by examiner

[Fig. 1]
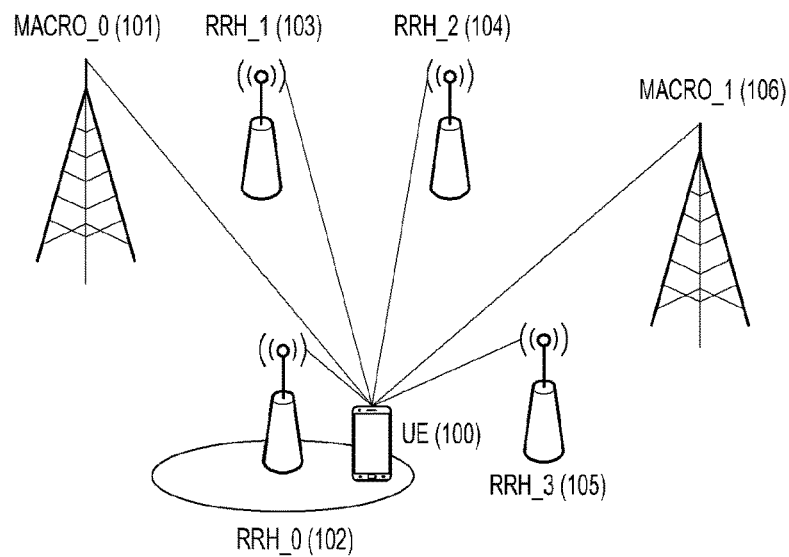
[Fig. 2]
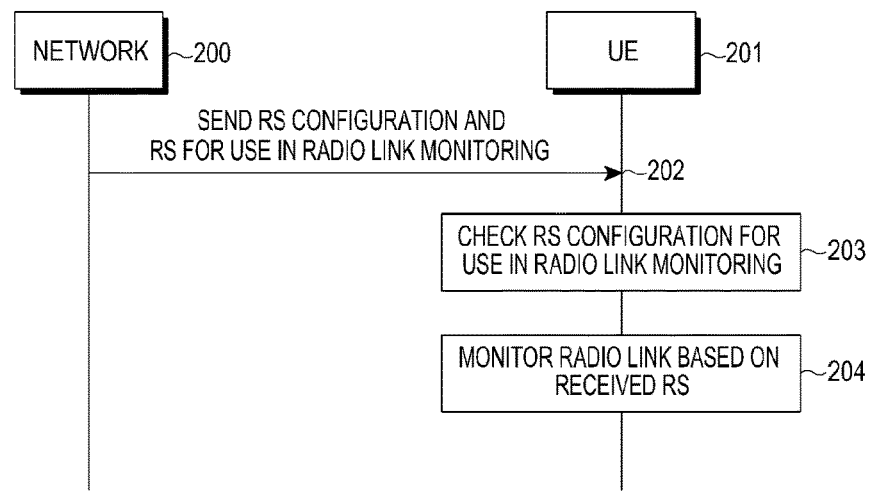
[Fig. 3]
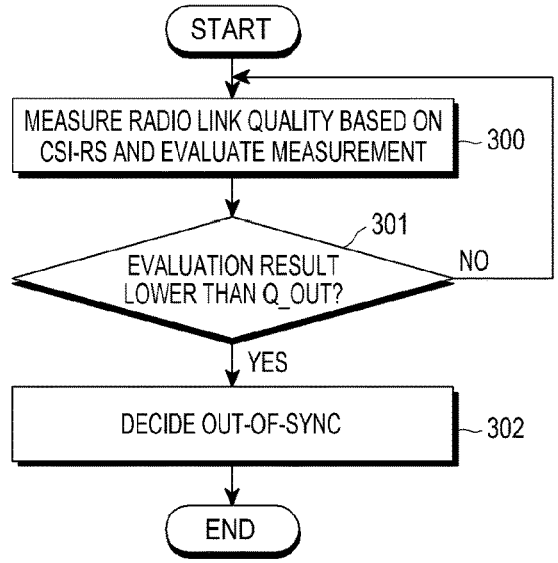

[Fig. 4]
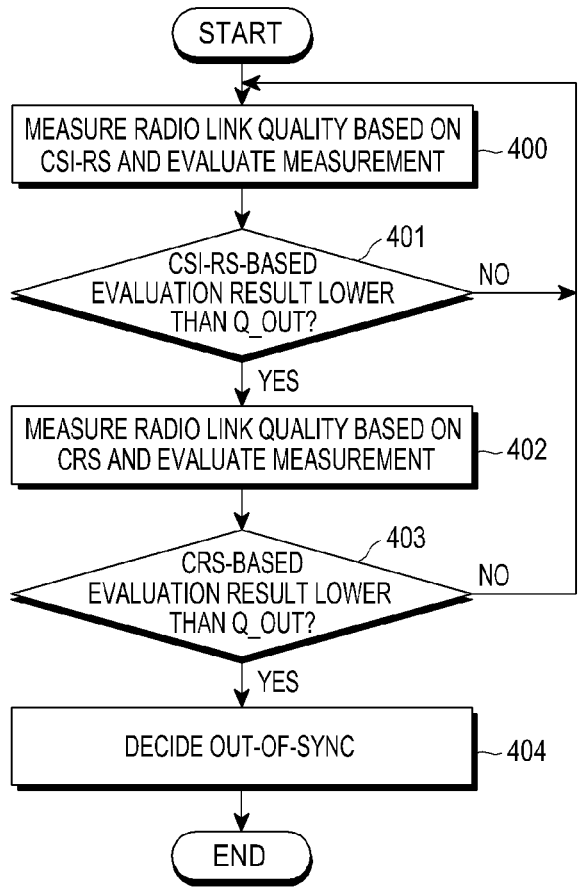
[Fig. 5]
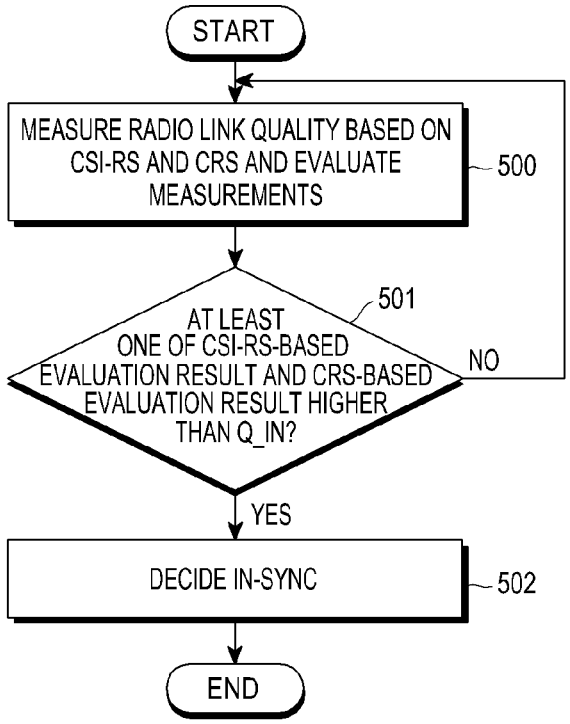

[Fig. 6]
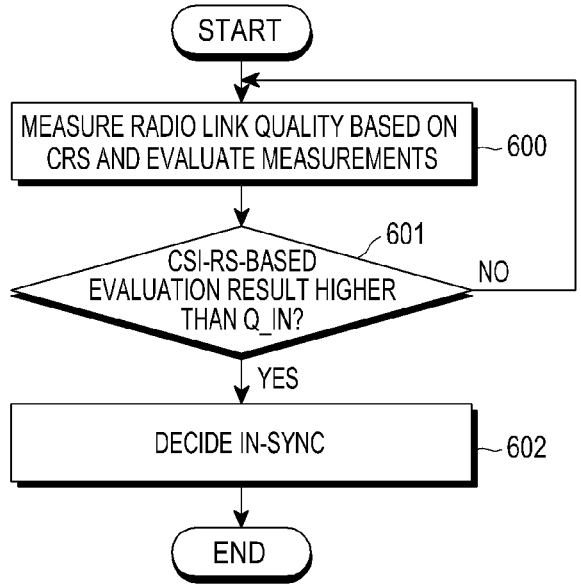
[Fig. 7]
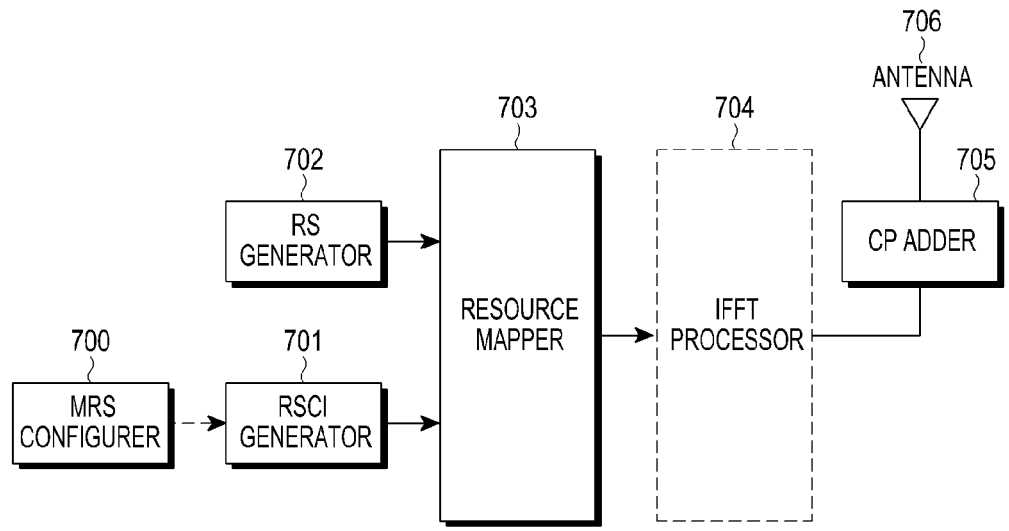
[Fig. 8]
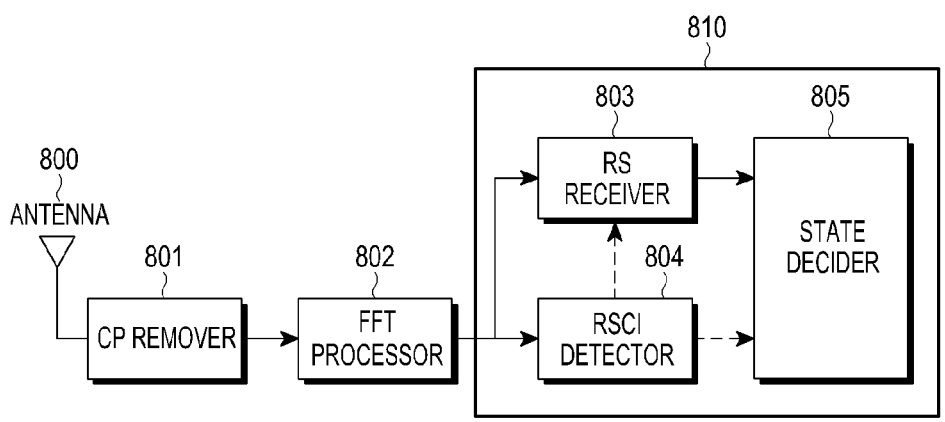

[Fig. 9]
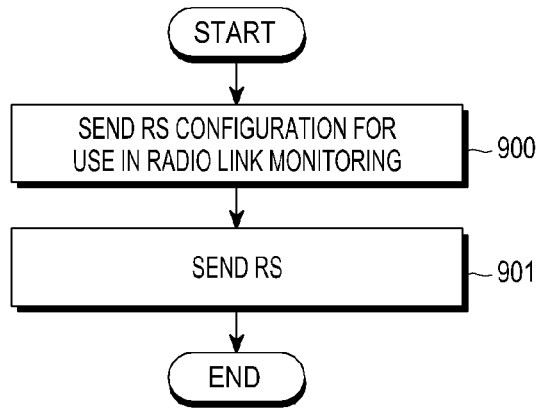
[Fig. 10]
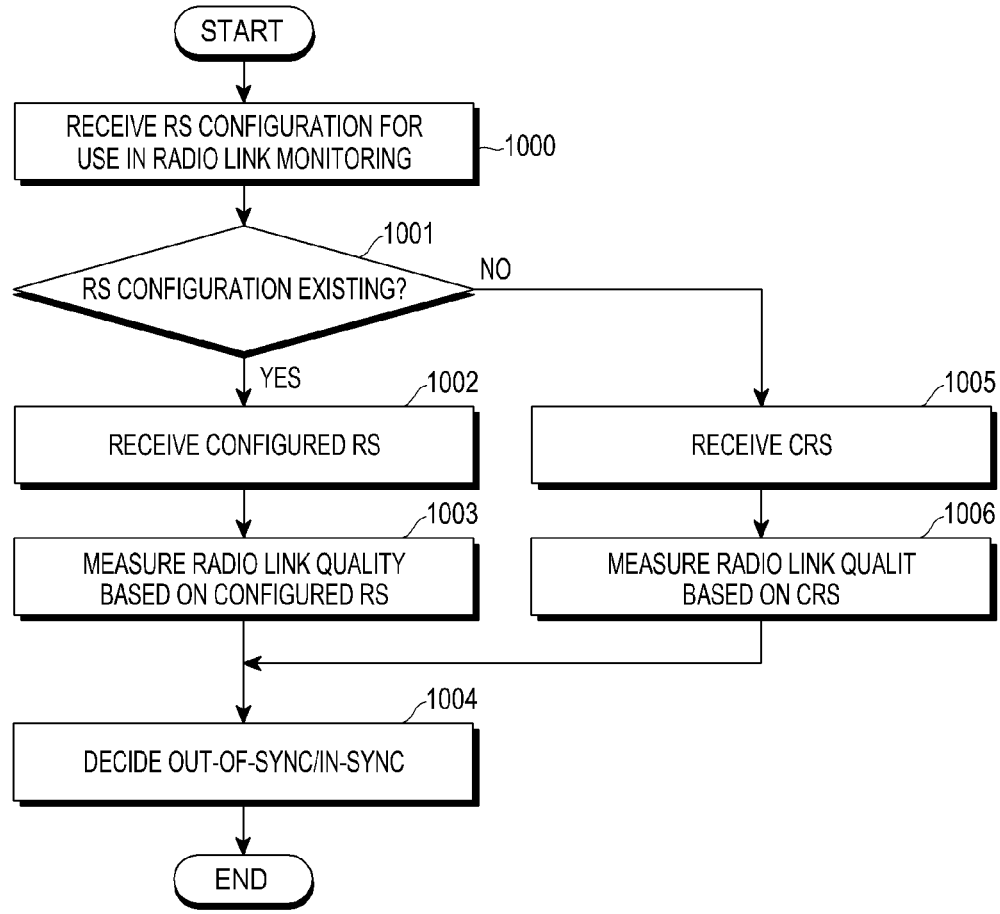

APPARATUS AND METHOD FOR RADIO LINK MONITORING IN A WIRELESS COMMUNICATION SYSTEM

PRIORITY

This application is a National Stage application under 35 U.S.C. § 371 of International Application No. PCT/KR2012/008044 filed Oct. 4, 2012, which claims priority under 35 U.S.C. § 365(b) to Korean Patent Application No. 10-2011-0100628 filed Oct. 4, 2011, the content of each of which is incorporated herein by reference.

TECHNICAL FIELD

The present invention relates to an apparatus and method for radio link monitoring in a wireless communication system, and more particularly, to an apparatus and method for monitoring a radio link by selective use of Reference Signals (RSs).

BACKGROUND ART

In a wireless communication system, a User Equipment (UE) generally monitors a radio link and evaluates a downlink channel state based on the monitoring result.

For example, the UE measures the channel state of a downlink using an RS received from a network and evaluates the channel quality of the downlink based on the measurement. Then the UE determines whether the downlink is reliable according to the evaluation result.

The above-described evaluation of the channel quality of a downlink by radio link monitoring is called 'radio link monitoring technology'.

A future-generation system, Long Term Evolution (LTE) developed by an asynchronous cellular mobile communication standardization body, the $3^{rd}$ Generation Partnership Project (3GPP) adopts the radio link monitoring technology.

For example, an evolved Node B (eNB) transmits a Common RS (CRS) on a downlink in the LTE system. A UE receives the CRS, measures the channel state of the downlink using the received CRS, and evaluates the link quality of the downlink based on the measured channel state of the downlink.

Meanwhile, 3GPP release 11 supports a scenario (e.g. Coordinated Multi-Point (CoMP)) in which a macro-eNB and Remote Radio Heads (RRHs) co-exist in a cell. The scenario is characterized in that a UE monitors radio links using CRSs received on a plurality of downlinks in a cell. The plurality of downlinks are links that connect the UE to the macro-eNB and at least one RRH.

In the scenario, the macro-eNB and the at least one RRH use the same cell ID. Accordingly, the macro-eNB and the at least one RRH within the same cell transmit CRSs in the same time/frequency resources. Consequently, the UE has difficulty in distinguishing a CRS transmitted from the macro-eNB from a CRS transmitted from the at least one RRH.

In general, a reliable operation of a UE cannot be expected unless the downlink quality between the UE and an eNB or each RRH is reflected in the radio link monitoring technology for a cell where a plurality of downlinks are established.

For instance, even though the UE can receive a sufficiently reliable service on a downlink in a cell to which the UE belongs, it may perform an unnecessary operation such as handover.

Moreover, introduction of an additional carrier type that does not carry a CRS used for radio link monitoring in the legacy system is under discussion in 3GPP release 11. This means that there will be an eNB or RRH which does not transmit a CRS in the legacy system. Due to the resulting unavailability of the conventional CRS-based radio link monitoring technology, it is expected with certainty that a new radio link monitoring technology will be required.

DISCLOSURE OF INVENTION

Technical Problem

An aspect of embodiments of the present invention is to address at least the problems and/or disadvantages and to provide at least the advantages described below. Accordingly, an aspect of embodiments of the present invention is to provide an apparatus and method for configuring an RS for use in radio link monitoring and transmitting configuration information about the RS to each UE by a network in a wireless communication system.

Another aspect of embodiments of the present invention is to provide an apparatus and method for performing radio link monitoring based on RS configuration information received from a network at a UE in a wireless communication system.

A further aspect of embodiments of the present invention is to provide an apparatus and method for efficiently evaluating the quality of a downlink using a network-configured RS.

Solution to Problem

In accordance with an embodiment of the present invention, there is provided a radio link monitoring method at a transmission point communicating with a network in which a Base Station (BS) and at least one Remote Radio Head (RRH) coexist within a cell, in which Reference Signal Configuration Information (RSCI) is received from the network to which the transmission point belongs, RSs of at least one RS type indicated by the received RSCI are received from the BS and the at least one RRH that coexist within the cell, and radio link monitoring is performed using the received RSs of the at least one RS type.

In accordance with another embodiment of the present invention, there is provided a radio link monitoring apparatus of a transmission point communicating with a network in which a BS and at least one RRH coexist within a cell, in which a receiver receives RSCI from the network to which the transmission point belongs and receives RSs of at least one RS type indicated by the received RSCI from the BS and the at least one RRH that coexist within the cell, and a radio link monitor performs radio link monitoring using the received RSs of the at least one RS type among RSs received at the receiver.

In accordance with another embodiment of the present invention, there is provided a method for controlling transmission of an RS for radio link monitoring at a transmission point corresponding to one of a BS and at least one RRH that coexist in a cell in a wireless communication system, in which at least one RS type is determined for radio monitoring, configuration information about the determined at least one RS type is transmitted, and a plurality of RSs including an RS corresponding to the at least one RS type are transmitted.

In accordance with a further embodiment of the present invention, there is provided an apparatus for controlling transmission of an RS for radio link monitoring at a transmission point corresponding to one of a BS and at least one RRH that coexist in a cell in a wireless communication system, which are configured to determine at least one RS type for radio monitoring, transmit configuration information about the determined at least one RS type, and transmit a plurality of RSs including an RS corresponding to the at least one RS type.

Advantageous Effects of Invention

As is apparent from the above description, since a network configures RSs suitable for radio link monitoring in various scenarios, a UE can monitor a radio link accurately and actively. Further, false radio link decision or unnecessary handover of the UE can be prevented.

While the present invention has been particularly shown and described with reference to embodiments thereof, it will be understood by those of ordinary skill in the art that various changes in form and details may be made therein without departing from the spirit and scope of the present invention as defined by the following claims.

BRIEF DESCRIPTION OF DRAWINGS

The above and other objects, features and advantages of certain embodiments of the present invention will be more apparent from the following detailed description taken in conjunction with the accompanying drawings, in which:

FIG. 1 illustrates an example of performing a conventional Common Reference Signal (CRS)-based radio link monitoring at a User Equipment (UE) in a scenario in which a macro-evolved Node B (macro-eNB) and a Remote Radio Head (RRH) coexist within a cell;

FIG. 2 is a diagram illustrating a signal flow between a network and a UE in a wireless communication system according to an embodiment of the present invention;

FIG. 3 is a flowchart illustrating a radio link monitoring operation of a UE according to an embodiment of the present invention;

FIG. 4 is a flowchart illustrating a radio link monitoring method when a network configures Channel State Information-Reference Signal (CSI-RSs) as an RS for radio link monitoring in a wireless communication system according to an embodiment of the present invention;

FIG. 5 is a flowchart illustrating a radio link monitoring method when the network configures CSI-RS and Common RS (CRS) as RSs for radio link monitoring in the wireless communication system according to an embodiment of the present invention;

FIG. 6 is a flowchart illustrating a radio link monitoring method when the network configures CRS as an RS for radio link monitoring in the wireless communication system according to an embodiment of the present invention;

FIG. 7 is a block diagram of a network for transmitting a radio link monitoring RS configuration signal and an RS in the wireless communication system according to an embodiment of the present invention;

FIG. 8 is a block diagram of a UE for performing radio link monitoring by receiving a radio link monitoring RS configuration signal and an RS in the wireless communication system according to an embodiment of the present invention;

FIG. 9 is a flowchart illustrating an operation for transmitting a radio link monitoring RS configuration and an RS in the network in the wireless communication system according to an embodiment of the present invention; and FIG. 10 is a flowchart illustrating an operation for performing radio link monitoring by receiving a radio link monitoring RS configuration and an RS at the UE in the wireless communication system according to an embodiment of the present invention.

Throughout the drawings, the same drawing reference numerals will be understood to refer to the same elements, features and structures.

MODE FOR THE INVENTION

Reference will be made to preferred embodiments of the present invention with reference to the attached drawings. A detailed description of a generally known function and structure of the present invention will be avoided lest it should obscure the subject matter of the present invention. In addition, although the terms used in the present invention are selected from generally known and used terms, the terms may be changed according to the intention of a user or an operator, or customs. Therefore, the present invention must be understood, not simply by the actual terms used but by the meanings of each term lying within.

In embodiments of the present invention as described later, a network configures a Reference Signal (RS) for use in radio link monitoring (hereinafter, referred to as a 'monitoring RS (MRS)') and provides configuration information about the MRS (hereinafter, referred to as 'Reference Signal Configuration Information (RSCI)') to a User Equipment (UE) in a wireless communication system.

For example, the MRS may be Common RS (CRS), Channel State Information (CSI-RS), or Demodulation RS (DM-RS).

Upon receipt of the RSCI from the network, the UE measures downlink quality using one or more types of RSs according to the received RSCI and evaluates radio link quality based on the measurements. The UE makes a decision as to "Out-of-sync" or "In-sync" based on the downlink quality evaluation. "Out-of-sync" means that the downlink state is not reliable, whereas "In-sync" means that the downlink state is reliable.

In the embodiments of the present invention, when the UE is connected to a network that does not transmit RSCI or fails to receive RSCI from a network, the UE determines "Out-of-sync" or "In-sync" using CRS.

Meanwhile, even though the network configures an MRS, the UE determines "Out-of-sync" or "In-sync" using an RS type that is not indicated by RSCI, when needed.

To achieve the above purposes, the network transmits RSCI to each UE in the embodiments of the present invention. RS types unsuitable or unavailable for radio link monitoring may exist in various cases including a scenario where a macro-evolved Node B (macro-eNB) and a plurality of Remote Radio Heads (RRHs) co-exist within a cell or a scenario where CRS is not transmitted on a downlink. In the embodiments of the present invention, the network configures an RS suitable for radio link monitoring, i.e. an MRS, taking into account the above cases.

The network may transmit RSCI by Radio Resource Control (RRC) signaling or other signaling. Each UE receives the RSCI and performs radio link monitoring based on the received RSCI.

If a UE is placed in a situation where it cannot receive RSCI (e.g. the UE is connected to a network that does not transmit RSCI), the UE can perform radio link monitoring using CRS in the embodiments of the present invention.

To determine "Out-of-sync" or "In-sync" using at least one type of MRS, the following methods for evaluating radio link quality are defined in the embodiments of the present invention.

One of the radio link quality evaluation methods is to determine "Out-of-sync" and "In-sync" using one type of MRS. Another radio link quality evaluation method is to determine "Out-of-sync" and "In-sync" using different types of MRSs. A third radio link quality evaluation method is to use different types of MRSs in determining both or each of "Out-of-sync" and "In-sync". The other radio link quality evaluation method is to produce various MRS combinations to determine "Out-of-sync" and "In-sync".

With reference to the attached drawings, radio link monitoring based on a configured MRS type, operations of a network and a UE for the radio link monitoring, and radio link quality evaluation methods according to embodiments of the present invention will be described below.

FIG. 1 illustrates the configuration of a wireless communication network according to an embodiment of the present invention. In the illustrated case of FIG. 1, it is assumed that the wireless communication network includes a serving cell to which a UE is currently connected and one neighbor cell adjacent to the serving cell.

Referring to FIG. 1, a macro-eNB 101 (Macro_0) and two Remote Radio Heads (RRHs) 102 and 103 (RRH_0 and RRH_1) exist within the serving cell, and a macro-eNB 106 (Macro_1) and two RRHs 104 and 105 (RRH_2 and RRH_3) exist within the neighbor cell.

RRH_0 extends service coverage with bias, rather than it determines the service overage based on the reception power level of an RS. Herein, it is assumed that a UE 100 is located at the edge of the service area of RRH_0.

Upon receipt of relatively good RSs from an eNB and RRHs of a neighbor cell, compared to RSs from an eNB and RRHs of a serving cell, a UE may attempt handover to the neighbor cell. For example, if the UE 100 receives good-quality RSs from Macro_1, RRH_2, and RRH_3 relative to RSs from Macro_0, RRH_0, and RRH_1, the UE 100 performs handover from RRH_0 to which the UE 100 currently belongs to the neighbor cell.

FIG. 2 is a diagram illustrating a signal flow between a network and a UE in a wireless communication system according to an embodiment of the present invention. The network may be configured to include any device capable of providing information to UEs as well as macro-eNBs and RRHs in the wireless communication system.

Referring to FIG. 2, a network 200 transmits RSCI and an RS corresponding to the RSCI to a UE 201 in step 202. The RS covers an RS that is not indicated by the RSCI as well as an MRS configured for use in radio link monitoring of the UE 201.

Upon receipt of the RSCI, the UE 201 checks an RS for use in radio link monitoring and an MRS configuration in step 203 and performs radio link monitoring using an MRS received from the network 200 to measure a downlink channel state in step 204. The received MRS corresponds to an RS whose configuration was checked.

While not shown in FIG. 2, the UE 201 evaluates radio link quality by comparing filtered CRS-based measurements during a specific previous time period with thresholds. If a level corresponding to the filtered results is lower than a lowest threshold Q_out, the UE 201 decides "Out-of-sync". If the level is higher than a highest threshold Q_in, the UE 201 decides "In-sync".

The physical layer of the UE 201 transmits an "Out-of-sync indication" or an "In-sync indication" to its higher layer according to the decision.

When receiving a predetermined number of or more consecutive "Out-of-sync indications", the higher layer of the UE 201 determines that the downlink quality is poor. Upon sensing the poor downlink quality, the higher layer of the UE 201 transitions to a physical layer problem detection state. To measure a time period for which the physical layer problem detection state is maintained, the UE 201 activates a specific timer.

If the UE 201 has not been recovered from the physical layer problem detection state until expiration of the specific timer, the higher layer of the UE 201 determines radio link failure. On the contrary, when receiving a predetermined number of or more consecutive "In-sync indications" from the physical layer until before expiration of the specific timer, the higher layer of the UE 201 transitions to a normal state. Meanwhile, the higher layer of the UE 201 may set a condition. If the condition is satisfied, the higher layer of the UE 201 may transition to the normal state irrespective of reception of the "In-sync indication". For example, after determining the radio link failure, the higher layer of the UE 201 determines a radio link normal state arbitrarily, thereby releasing the UE 201 from the radio link failure state.

Table 1 below illustrates exemplary RS types configured for radio link monitoring in RSCI by a network according to an embodiment of the present invention. It is assumed here that a macro-eNB, RRH 1, and RRH 2 exist within a cell in the network.

TABLE 1

| RS configured for radio link monitoring | Characteristics |
|---|---|
| CRS | Transmitted from Macro, RRH 0, RRH 1, RRH 2 |
| CSI-RS 0 | Transmitted from RRH 0 with configuration A |
| CSI-RS 1 | Transmitted from RRH 1 with configuration B |
| CSI-RS 2 | Transmitted from RRH 2 with configuration C |

CRS represents RSs transmitted on downlinks from the macro-eNB and RRHs 0, 1 and 2 in the cell. Channel State Information RS (CSI-RS) 0 represents a CSI-RS transmitted on a downlink from RRH 0. The transmission available time of CSI-RS 1 is set by the network. The transmission available time is expressed as 'Configuration A'.

CSI-RS 1 represents a CSI-RS on a downlink transmitted from RRH 1 at a set transmission available time 'Configuration B', whereas CSI-RS 2 represents a CSI-RS transmitted on a downlink from RRH 2 at a set transmission available time 'Configuration C'.

It is assumed that the transmission available times of CSI-RSs 0, 1 and 2, namely Configurations A, B, C are different.

The network may configure one or more of the RS types listed in (Table 1) as an MRS for a UE.

For example, the network may configure an RS type for deciding "Out-of-sync" and an RS type for deciding "In-sync", separately and notify a UE of the RS types. On the other hand, the RS may configure the same RS type for deciding "Out-of-sync" and "In-sync" so that the UE may use the same MRS to decide "Out-of-sync" and "In-sync".

RSCI that the network transmits to a UE includes information about the type of an MRS (e.g. CRS, CSI-RS, etc.) and, if at least one CSI-RS type is included, information about the configuration of the at least one CSI-RS type and a CSI-RS subframe configuration. However, the RSCI may cover information about all RS types transmitted on downlinks and transmission configuration information, not limited to CRS and CSI-RS.

To enable a UE to monitor an RS received from a neighbor cell as well as an RS received from a serving cell, the network may transmit RSCI for monitoring the RS of the neighbor cell by additional signaling.

FIG. 3 is a flowchart illustrating a radio link monitoring operation of a UE according to an embodiment of the present invention. In the illustrated case of FIG. 3, the network configures CSI-RS as an MRS type in the wireless communication system.

In the CSI-RS-based radio link monitoring method illustrated in FIG. 3, a macro eNB and each RRH may transmit CSI-RSs at different time points according to CSI-RS configurations. As a consequence, the afore-mentioned problem encountered with radio link monitoring using CRSs transmitted in the same resources from an eNB and RRHs can be overcome.

Referring to FIG. 3, a UE evaluates radio link quality of downlinks based on channel states measured from received CSI-RSs in step 300. The UE compares the evaluated radio link quality with a lowest threshold for deciding "Out-of-sync", Q_out in step 301.

If the evaluated radio link quality is lower than the lowest threshold Q_out, the UE decides "Out-of-sync" for the current radio links in step 302. In contrast, if the evaluated radio link quality is equal to or higher than the lowest threshold Q_out, the UE receives CSI-RSs to continue radio link monitoring without deciding "Out-of-sync".

The radio link monitoring method illustrated in FIG. 3 is applicable to "In-sync" decision. Specifically, if the CSI-RS-based evaluation result is higher than a highest threshold Q_in, the UE decides "In-sync".

The above-described radio link monitoring method can be extended to a case where the network configures a plurality of CSI-RS types having different CSI-RS configurations for use in radio link monitoring.

For example, the UE evaluates radio link quality based on each of the configured plurality of CSI-RS types. Then the UE compares the evaluation results with the lowest threshold Q_out, for "Out-of-sync" decision. For instance, if every evaluated radio link quality is lower than the lowest threshold Q_out, the UE decides "Out-of-sync". On the other hand, if at least one of the evaluated radio link qualities is equal to or higher than the lowest threshold Q_out, the UE does not decide "Out-of-sync".

This is because if at least one of downlinks from a macro-eNB and a plurality of RRHs in a serving cell is reliable, the UE can make the most of available links in the serving cell by not deciding "Out-of-sync". Consequently, unnecessary operations of the UE can be minimized.

The radio link monitoring method illustrated in FIG. 3 is applicable to "In-sync" decision. For example, if at least one of evaluated radio links is higher than the highest threshold Q_in, the UE decides "In-sync". Alternatively, only when every evaluated radio link quality is higher than the highest threshold Q_in, the UE may decide "In-sync".

FIG. 4 is a flowchart illustrating a radio link monitoring operation of a UE according to another embodiment of the present invention. In the illustrated case of FIG. 4, the network configures both CSI-RS and CRS as MRS types in the wireless communication system.

The transmission density of CSI-RS is lower than that of CRS in CSI-RS-based radio link monitoring described with reference to FIG. 3. Therefore, CSI-RS-based radio link monitoring may be lower than CRS-based radio link monitoring in terms of measurement accuracy. Moreover, when a UE moves to an edge of a specific RRH area and thus the signal levels of CSI-RSs become weak, CRSs transmitted from a macro-eNB and RRHs within a cell should be used for radio link monitoring.

In this context, a method for complementing CSI-RS-based radio link monitoring with CRS-based radio link monitoring is provided in FIG. 4. Specifically, a UE primarily evaluates radio link quality by CSI-RS-based radio link monitoring, and then secondarily evaluates radio link quality by CRS-based radio link monitoring.

Referring to FIG. 4, a UE measures a downlink channel state by CSI-RS-based radio link monitoring and primarily evaluates radio link quality based on the measured downlink channel state in step 400. The UE compares the primarily evaluated radio link quality with the threshold Q_out in step 401. The threshold Q_out is a predetermined reference value by which to decide "Out-of-sync".

If the primarily evaluated radio link quality is lower than the threshold Q_out, the UE measures a downlink channel state by radio link monitoring using received CRSs and secondarily evaluates radio link quality based on the measured downlink channel state in step 402. The UE compares the secondarily evaluated radio link quality with the threshold Q_out in step 403.

If the secondarily evaluated radio link quality is lower than the threshold Q_out, the UE decides "Out-of-sync" for the current links, that is, the primarily monitored downlinks in step 404.

On the other hand, if at least one of the primarily and secondarily evaluated radio link qualities is equal to or higher than the threshold Q_out in step 401 or 403, the UE does not decide "Out-of-sync". In this case, the UE returns to step 400 to continue CSI-RS-based radio link monitoring and CRS-based radio link monitoring.

The radio link monitoring method illustrated in FIG. 4 is applicable to "In-sync" decision. If at least one of the CSI-RS-based evaluation result and the CRS-based evaluation result is higher than the highest threshold Q_in, the UE decides "In-sync". Alternatively, only when both the CSI-RS-based evaluation result and the CRS-based evaluation result are higher than the threshold Q_in, the UE decides "In-sync".

The embodiment of the present invention illustrated in FIG. 4 can be extended to the case of using a plurality of CSI-RS types having different configurations and CRS for use in radio link monitoring. For example, the UE evaluates radio link qualities based on the configured CSI-RS types and compares the evaluation results with the threshold Q_out. If every evaluated radio link quality is lower than the threshold Q_out, the UE secondarily evaluates radio link quality based on CRS.

If the CRS-based evaluation result is lower than the threshold Q_out, the UE finally decides "Out-of-sync". That is, in the presence of any reliable downlink from a macro-eNB and a plurality of RRHs within a serving cell, a UE does not decide "Out-of-sync". Therefore, the utilization of available links in the cell is maximized and unnecessary UE operations are minimized.

The radio link monitoring method illustrated in FIG. 4 is applicable to "In-sync" decision. If at least one of CSI-RS-based evaluation results is higher than the highest threshold Q_in, the UE secondarily evaluates radio link quality by CRS-based radio link monitoring. If the CRS-based evaluation result is also higher than the threshold Q_in, the UE decides "In-sync".

Alternatively, only if all of the primary and secondary evaluation results are higher than the threshold Q_in, the UE decides "In-sync". While CSI-RS-based radio link monitoring and CRS-based radio link monitoring are shown as performed separately in FIG. 4, it is also possible to implement CSI-RS-based radio link monitoring and CRS-based radio link monitoring in one step. In other words, the control flow may be implemented by incorporating steps 400 and 402 into one step and incorporating steps 401 and 403 into one step.

FIG. 5 is a flowchart illustrating a radio link monitoring method of a UE according to another embodiment of the present invention. That is, FIG. 5 provides another radio link monitoring method in the case where CSI-RS and CRS are configured as MRS types in the wireless communication system. In the radio link monitoring operation of FIG. 5, when a predetermined number of "Out-of-sync" decisions have been made consecutively, a UE transitions to a physical layer problem detection state and activates a timer.

If the UE has not been recovered from the physical layer detection state until expiration of the timer, the UE decides radio link failure. On the contrary, if the UE receives a predetermined number of "In-sync" decisions consecutively from the physical layer, the UE returns to a normal state.

In the embodiment of the present invention illustrated in FIG. 5, the UE uses CRS having a relatively high density compared to CSI-RS as well as CSI-RS in evaluating radio link quality in order to fast recover from the physical layer problem detection state.

Referring to FIG. 5, the UE evaluates CSI-RS-based radio link quality and CRS-based radio link quality based on channel states measured by monitoring CSI-RSs and CRSs, respectively in step 500. The UE compares the link quality evaluation results with the highest threshold Q_in being a reference value for deciding "In-sync" in step 501.

If at least one of the CSI-RS-based evaluation result and the CRS-based evaluation result is higher than the threshold Q_in, the UE decides "In-sync" in step 502. On the contrary, if both of the CSI-RS-based evaluation result and the CRS-based evaluation result are equal to or lower than the threshold Q_in, the UE continues CSI-RS-based radio link monitoring and CRS-based radio link monitoring without deciding "In-sync".

The radio link monitoring method illustrated in FIG. 5 is applicable to "Out-of-sync" decision. Specifically, if both of the CSI-RS-based evaluation result and the CRS-based evaluation result are lower than the lowest threshold Q_out, the UE decides "Out-of-sync".

The embodiment of the present invention illustrated in FIG. 5 can be extended to the case where the network configures a plurality of CSI-RS types having different configurations and CRS for use in radio link monitoring. For example, the UE evaluates radio link quality based on each of the plurality of CSI-RSs having different configurations and then evaluates CRS-based radio link quality. If at least one of the two evaluation results is higher than the highest threshold Q_in, the UE decides "in-sync".

The radio link monitoring method illustrated in FIG. 5 is also applicable to "Out-of-sync" decision. Only when every evaluation result is lower than Q_out, the UE decides "Out-of-sync".

FIG. 6 illustrates a radio link monitoring operation of a UE according to another embodiment of the present invention. In the illustrated case of FIG. 6, CRS is configured as an MRS type in the wireless communication system.

In the embodiment of the present invention illustrated in FIG. 6, to fast recover from the physical layer problem detection state, the UE uses CRS having a high density relative to CSI-RS in evaluating radio link quality.

Referring to FIG. 6, the UE evaluates a CRS-based radio link quality according to a channel state measured by monitoring CRSs in step 600 and compares the link quality evaluation result with the highest threshold Q_in being a reference value for deciding "In-sync" in step 601.

If the CRS-based evaluation result is higher than the threshold Q_in, the UE decides "In-sync" in step 602.

On the contrary, if the CRS-based evaluation result is equal to or lower than the threshold Q_in, the UE continues CRS-based radio link monitoring without deciding "In-sync". Meanwhile, the UE may adopt a method for evaluating radio link quality based on a combination of CSI-RS and CRS to decide "Out-of-sync".

Even though RSCI received from the network does not indicate CRS as an MRS type, the UE may arbitrarily add CRS-based radio link monitoring. For example, if the UE determines that fast recovery from the physical layer problem detection state is preferred, the UE may evaluate radio link quality based on relatively densely populated CRSs, regarding "In-sync" decision.

FIG. 7 is a block diagram of a network for transmitting an MRS configuration signal and an RS in the wireless communication system according to an embodiment of the present invention.

Referring to FIG. 7, the network includes an MRS configurer 700, an RSCI generator 701, an RS generator 702, a resource mapper 703, an Inverse Fast Fourier Transform (IFFT) processor 704, a Cyclic Prefix (CP) adder 705, and an antenna 706.

The MRS configurer 700 determines an MRS type for use in a UE's radio link monitoring. One or more MRS types may be determined for the UE. Since examples of determining an MRS type have been described, a detailed description will not be provided herein.

The MRS configurer 700 notifies the RSCI generator 701 of the determined MRS type.

The RSCI generator 701 configures RSCI including information about the MRS type determined by the MRS configurer 700 based on information needed for radio link monitoring using the determined MRS type.

The RS generator 702 generates an RS. The RS generator 702 basically generates an MRS configured for the UE's radio link monitoring by the MRS configurer 700. Besides the MRS, the RS generator 702 may further generate an RS that has not been designated as an MRS type.

The resource mapper 703 receives the RSCI generated by the RSCI generator 701 and various types of RSs including the MRS generated by the RS generator 702 and maps the RSCI and the RSs to time-frequency resources.

The IFFT processor 704 converts the RSCI and RSs to a time signal by IFFT. The CP adder 705 inserts a CP into the time signal received from the IFFT processor 704. The CP-inserted signal is transmitted through the antenna 706.

FIG. 8 is a block diagram of a UE for radio link monitoring in the wireless communication system according to an embodiment of the present invention.

Referring to FIG. 8, the UE includes an antenna 800, a CP remover 801, an FFT processor 802, an RS receiver 803, an RSCI detector 804, and a state decider 805. The antenna 800, the CP remover 801, and the FFT processor 802 collectively form a receiver for receiving a signal from the network and converting the received signal to a frequency signal. The RS receiver 803, the RSCI detector 804, and the state decider 805 collectively form a radio link monitor for monitoring a radio link based on an MRS.

The CP remover 801 receives a downlink signal through the antenna 800 and removes a CP from the received downlink signal. The FFT processor 802 converts the downlink time signal received from the CP remover 801 to a frequency signal by FFT. The downlink frequency signal is provided to the RS receiver 803 and the RSCI detector 804.

The RSCI detector 804 extracts RSCI from the downlink frequency signal. The extracted RSCI is information needed for the UE to monitor downlink quality. For example, the RSCI includes information indicating an MRS type with which to measure the downlink quality.

The RSCI is provided to the RS receiver 803 and the state decider 805.

The RS receiver 803 extracts an RS from the downlink frequency signal received from the FFT processor 802. The RS receiver 803 may extract all RSs or only an MRS from the downlink signal. In the former case, the RS receiver 803 does not require additional information. In the latter case, the RS receiver 803 needs to use the RSCI extracted by the RSCI detector 804.

Therefore, the RS receiver 803 may determine whether to receive the RSCI from the RSCI detector 804 according to an RS type or RS types to be extracted from the downlink signal.

When the RS receiver 803 can identify an MRS based on the RSCI, it measures radio link quality based on the extracted MRS and provides the measured radio link quality to the state decider 805.

As described before, the RS receiver 803 provides the received RSs to the state decider 805 so that the state decider 805 may measure radio link quality. In addition, the RS receiver 803 measures the radio link quality based on the MRS among the received RSs and provides the measured radio link quality to the state decider 805 so that the state decider 805 decides the operation state of the UE.

To measure the radio link quality, the state decider 805 should receive the RSCI from the RSCI detector 804.

For the convenience' sake of description, it is assumed that the RS receiver 803 measures radio link quality, which should not be construed as limiting the scope of the present invention.

The state decider 805 evaluates the radio link quality based on the measurement obtained using at least one MRS type indicated by the RSCI.

For instance, the state decider 805 compares the measurement based on the at least one MRS type with a predetermined threshold and decides the state of the UE between "Out-of-sync" and "In-sync". To make a decision on the state of the UE, the lowest threshold Q_out and the highest threshold Q_in may be preset.

FIG. 9 is a flowchart illustrating an operation for transmitting an MRS configuration and an RS in the network in the wireless communication system according to an embodiment of the present invention.

Referring to FIG. 9, the network determines an MRS type and configures RSCI including information about the determined MRS type. The network transmits the configured RSCI on a predetermined channel in step 900. For example, the RSCI may be transmitted by RRC signaling or other signaling.

The network generates an MRS according to the RSCI and transmits the MRS to step 901. Although the network should transmit the MRS, it does not transmit only the MRS. That is, the network transmits other RSs in addition to the MRS.

FIG. 10 is a flowchart illustrating an operation for performing radio link monitoring by receiving an MRS configuration and an RS at the UE in the wireless communication system according to an embodiment of the present invention.

Referring to FIG. 10, the UE receives RSCI from the network, for use in radio link monitoring in step 1000. The UE performs a different monitoring procedure depending on whether an MRS is set in the RSCI. Therefore, the UE determines whether an MRS type has been set in the received RSCI in step 1001.

If an MRS type has been set in the received RSCI, the UE receives an MRS corresponding to the MRS type in step 1002 and measures a downlink state using the received MRS in step 1003. If a plurality of MRS types have been set, the UE receives each of MRSs corresponding to the MRS types and measures the downlink state using each MRS.

On the contrary, if no MRS type has been set in the received RSCI, the UE receives CRSs basically provided from the network in step 1005 and measures the downlink state based on the received CRSs in step 1006.

The UE decides its state, that is, downlink channel quality based on the MRS-based or CRS-based measurement result. The state is one of "Out-of-sync" and "In-sync".

Examples of deciding the state of the UE between "Out-of-sync" and "In-sync" based on a downlink measurement have been described before and thus a detailed description of them will not be provided herein.

The invention claimed is:

1. A radio link monitoring method by a user equipment (UE) communicating with a network in which a base station (BS) and at least one remote radio head (RRH) coexist within a cell, the method comprising:
   receiving reference signal configuration information (RSCI) from the network to which the UE belongs, the RSCI including information indicating at least two reference signal (RS) types which are used for a monitoring RS (MRS) among a plurality of RS types, information indicating a first RS tyre used by the UE to determine an unreliable radio link state, information indicating a second RS type used by the UE to determine a reliable radio link state, and information related to a plurality of different time points respectively corresponding to the plurality of RS types;
   receiving at least two RSs transmitted from at least one of the BS or the at least one RRH at a time point determined based on the RSCI;
   monitoring a radio link using the received at least two RSs; and
   obtaining a monitoring result per the received at least two RSs,
   wherein an RS type is determined based on whether the RS is transmitted by the BS or the at least one RRH,
   wherein obtaining the monitoring result per the received at least two RSs includes:
   obtaining a first monitoring result by monitoring a channel state information (CSI)-RS;
   determining whether the first monitoring result satisfies a lowest threshold;
   obtaining a second monitoring result by monitoring a common RS (CRS) in case that the first monitoring result does not satisfy the lowest threshold;
   determining whether the second monitoring result satisfies the lowest threshold; and
   determining that the UE is in the unreliable radio link state in case that the second monitoring result does not satisfy the lowest threshold,
   wherein the at least two RS types include the first RS type and the second RS type, and wherein the received at least two RSs include at least one RS corresponding to the first RS type and at least one RS corresponding to the second RS type.

2. The radio link monitoring method of claim 1, further comprising determining radio link quality based on the obtained monitoring result.

3. The radio link monitoring method of claim 2, wherein determining the radio link quality comprises determining that the UE is in a reliable radio link state, when the obtained monitoring result indicates that at least one of radio links to the BS or the at least one RRH is reliable.

4. The radio link monitoring method of claim 2, wherein determining the radio link quality comprises:
   determining that the UE is in the unreliable radio link state using a first RS, if the obtained monitoring result does not satisfy a lowest threshold, Q_out; and
   determining that the UE is in the reliable radio link state using a second RS, if the obtained monitoring result satisfies a highest threshold, Q_in.

5. The radio link monitoring method of claim 4, wherein the plurality of RS types includes a CSI-RS and a CRS.

6. The radio link monitoring method of claim 5, wherein determining the radio link quality comprises determining that the UE is in the reliable radio link state, if an RS type of the received at least one RS is a CRS and the obtained monitoring result satisfies a highest threshold Q_in.

7. The radio link monitoring method of claim 4, further comprising determining radio link failure, if a decision on the unreliable radio link state is kept until expiration of a timer that has been activated when the unreliable radio link state is initially determined.

8. The radio link monitoring method of claim 7, further comprising determining a normal radio link state when a predetermined number of decisions are consecutively made on the reliable radio link state before expiration of the timer.

9. The radio link monitoring method of claim 7, further comprising recovering from the radio link failure by arbitrarily determining a normal radio link state after determining the radio link failure.

10. A radio link monitoring apparatus of a user equipment (UE) communicating with a network in which a base station (BS) and at least one remote radio head (RRH) coexist within a cell, the radio link monitoring apparatus comprising:
   a receiver configured to:
      receive reference signal configuration information (RSCI) from the network to which the UE belongs, the RSCI including information indicating to at least two reference signal (RS) types which are used for a monitoring RS (MRS) among a plurality of RS types, information indicating a first RS type used by the UE to determine an unreliable radio link state, information indicating a second RS type used by the UE to determine a reliable radio link state, and information related to a plurality of different time points respectively corresponding to the plurality of RS types, and
      receive at least two RSs transmitted from at least one of the BS or the at least one RRH at a time point, based on the RSCI; and
   a radio link monitor configured to monitor radio link using the received at least two RSs, and obtain a monitoring result per the received at least two RSs,
   wherein an RS type is determined based on whether the RS is transmitted by the BS or the at least one RRH,
   wherein the radio link monitor obtains the monitoring result per the received at least two RSs by:
      obtaining a first monitoring result by monitoring a channel state information (CSI)-RS;
      determining whether the first monitoring result satisfies a lowest threshold;
      obtaining a second monitoring result by monitoring a common RS (CRS) in case that the first monitoring result does not satisfy the lowest threshold;
      determining whether the second monitoring result satisfies the lowest threshold; and
      determining that the UE is in the unreliable radio link state in case that the second monitoring result does not satisfy the lowest threshold,
   wherein the at least two RS types includes the first RS type and the second RS type, and
   wherein the received at least two RSs include at least one RS corresponding to the first RS type and at least one RS corresponding to the second RS type.

11. The radio link monitoring apparatus of claim 10, wherein the radio link monitor is further configured to determine radio link quality based on the obtained monitoring result.

12. The radio link monitoring apparatus of claim 11, wherein the radio link monitor is further configured to determine that the UE is in a reliable radio link state, when the obtained monitoring result indicates that at least one of radio links to the BS or the at least one RRH is reliable.

13. The radio link monitoring apparatus of claim 11, wherein the radio link monitor is further configured to determine that the UE is in the unreliable radio link state using a first RS, if the obtained monitoring result does not satisfy a lowest threshold, Q_out, and determine that the UE is in the reliable radio link state using a second RS, if the obtained monitoring result satisfies a highest threshold, Q_in.

14. The radio link monitoring apparatus of claim 13, wherein the plurality of RS types includes a CSI-RS and a CRS.

15. The radio link monitoring apparatus of claim 14, wherein the radio link monitor is further configured to determine that the UE is in the reliable radio link state, if an RS type of the received RS is a CRS and the obtained monitoring result satisfies a highest threshold, Q_in.

16. The radio link monitoring apparatus of claim 13, wherein the radio link monitor is further configured to determine radio link failure, if a decision on the unreliable radio link state is kept until expiration of a timer that has been activated when the unreliable radio link state is initially determined.

17. The radio link monitoring apparatus of claim 16, wherein the radio link monitor is further configured to determine a normal radio link state, when a predetermined number of decisions are consecutively made on the reliable radio link state before expiration of the timer.

* * * * *